(12) United States Patent
Son et al.

(10) Patent No.: US 10,076,995 B2
(45) Date of Patent: Sep. 18, 2018

(54) AUTOMOTIVE LAMP

(71) Applicant: SL Corporation, Daegu (KR)

(72) Inventors: Youngho Son, Gyeonsangbuk-Do (KR);
Byoungki Ji, Gyeongsangbuk-Do (KR);
Hye Jin Han, Gyeongsangbuk-Do (KR); Jong Ryoul Park,
Gyeongbuk-Do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/158,110

(22) Filed: May 18, 2016

(65) Prior Publication Data
US 2016/0257243 A1 Sep. 8, 2016

Related U.S. Application Data

(63) Continuation-in-part of application No. 13/313,616, filed on Dec. 7, 2011, now Pat. No. 9,688,188.

(30) Foreign Application Priority Data

Dec. 7, 2015 (KR) ........................ 10-2015-0172977

(51) Int. Cl.
*B60Q 1/00* (2006.01)
*B60Q 1/26* (2006.01)
(Continued)

(52) U.S. Cl.
CPC ................. *B60Q 1/22* (2013.01); *B60Q 1/50* (2013.01); *B60Q 2400/50* (2013.01)

(58) Field of Classification Search
CPC ......... B60Q 1/22; B60Q 1/50; B60Q 2400/50
(Continued)

(56) References Cited

U.S. PATENT DOCUMENTS 7,315,235 B1 * 1/2008 Fairchild .................. B60Q 1/50
340/425.5
8,531,285 B2 * 9/2013 Purks ....................... B60Q 1/38
340/435
(Continued)

FOREIGN PATENT DOCUMENTS

EP 1334869 A2 8/2003
EP 1433655 A2 6/2004
(Continued)

OTHER PUBLICATIONS

Extended European Search Report dated Apr. 7, 2017 in corresponding EP Application No. 16202628.

*Primary Examiner* — Karabi Guharay
*Assistant Examiner* — Jessica M Apenteng
(74) *Attorney, Agent, or Firm* — Mintz Levin Cohn Ferris Glovsky and Popeo, P.C.; Kongsik Kim; Jhongwoo Jay Peck

(57) ABSTRACT

An automotive lamp provides information to vehicles approaching from at least one side of the rear of a vehicle of the driving state of the vehicle by irradiating light for forming a road pattern indicating the driving state of the vehicle. The automotive lamp includes a detection unit configured to detect a driving state of a vehicle, a reversing lamp configured to indicate a reverse movement of the vehicle, a lamp unit configured to irradiate light for forming a road pattern indicating the state of the vehicle to the rear of the vehicle such that the road pattern can be formed on at least one side of the vehicle. A control unit is configured to control the lamp unit based on the detected driving state of the vehicle. The luminous intensity of the lamp unit is equal to, or greater than, the luminous intensity of the reversing lamp.

18 Claims, 24 Drawing Sheets

(51) Int. Cl.
 *B60Q 1/22* (2006.01)
 *B60Q 1/50* (2006.01)

(58) Field of Classification Search
 USPC .......................................................... 362/487
 See application file for complete search history.

(56) References Cited

U.S. PATENT DOCUMENTS

| | | | |
|---|---|---|---|
| 2003/0146827 A1* | 8/2003 | Koike | B60Q 1/50 |
| | | | 340/435 |
| 2005/0117364 A1 | 6/2005 | Rennick et al. | |
| 2007/0222574 A1* | 9/2007 | Courts | B60Q 1/24 |
| | | | 340/468 |
| 2008/0123357 A1* | 5/2008 | Steffel | B60Q 1/2607 |
| | | | 362/487 |
| 2008/0175012 A1* | 7/2008 | Shimaoka | B60Q 1/085 |
| | | | 362/464 |
| 2011/0128141 A1 | 6/2011 | Purks et al. | |
| 2012/0075875 A1 | 3/2012 | Son et al. | |
| 2013/0335212 A1 | 12/2013 | Purks et al. | |
| 2014/0328071 A1 | 11/2014 | Son et al. | |

FOREIGN PATENT DOCUMENTS

| | | |
|---|---|---|
| JP | 2000-198384 A | 7/2000 |
| JP | 2008155767 A | 7/2008 |
| KR | 2013-0006067 A | 1/2013 |

* cited by examiner

AUTOMOTIVE LAMP

CROSS-REFERENCE TO RELATED APPLICATION

This application is a Continuation in Part of U.S. patent application Ser. No. 13/313,616 filed on Dec. 7, 2011, which claims priority to Korean Application No. 10-2011-0067889 filed on Jul. 8, 2011. This application claim priority to Korean Application No. 10-2015-0172977 filed on Dec. 7, 2015. The applications are herein incorporated by reference.

BACKGROUND

1. Field of the Invention

The present invention relates to an automotive lamp, and more particularly, to an automotive lamp capable of informing vehicles approaching from at least one side of the rear of a vehicle of the driving state of the vehicle by irradiating light for forming a road pattern indicating the driving state of the vehicle.

2. Description of the Related Art

Generally, a vehicle includes various lamps having a lighting function that enable a driver to easily recognize objects around the vehicle when driving at night and a signaling function for informing drivers of other vehicles or pedestrians about a driving state of the vehicle. For example, a head lamp and a fog lamp are used to provide a lighting function, and a blinker, a reversing lamp, a stop lamp and a side marker are used to provide a signaling function. Among them, the reversing lamp is turned on in the reverse movement of the vehicle to inform other drivers of the reverse movement such that other drivers can make preparations.

In particular, since the reversing lamp is installed on the rear side of the vehicle, it is difficult for a vehicle approaching from a left or right side behind the vehicle to check the reversing lamp. Accordingly, a vehicle accident due to failing to recognize the reverse movement of the vehicle may occur. Further, when a driver opens a door of the vehicle and exits the vehicle, another vehicle approaching from one side in front of the vehicle can check that the driver that exits the vehicle, whereas it is difficult for another vehicle approaching from one side behind the vehicle to check that the driver is exiting the vehicle. Accordingly, there is a demand for a method enabling other vehicles to easily evaluation where a vehicle is reversing or a door is ajar.

The above information disclosed in this section is merely for enhancement of understanding of the background of the invention and therefore it may contain information that does not form the prior art that is already known in this country to a person of ordinary skill in the art.

SUMMARY

The present invention provides an automotive lamp capable of irradiating light of a road pattern that indicates a state of a vehicle to at least one side of the front or the rear of the vehicle and thereby allows vehicles approaching from at least one side of the rear of the vehicle to determine the driving state of the vehicle.

The present invention includes an automotive lamp that may prevent the occurrence of an accident by informing vehicles or pedestrians approaching from at least one side of the rear of a vehicle of a driving state of the vehicle, such as a reverse movement of a vehicle and opening of a door, through a road pattern formed on at least one side at the rear of the vehicle. The present invention may also include an automotive lamp that lights a road pattern that indicates a driving state of a vehicle, but also lights a road pattern that indicates the presence of any risks, to the rear of a vehicle.

According to an aspect of the present invention, an automotive lamp may include a detection unit configured to detect a driving state of a vehicle, a reversing lamp configured to indicate a reverse movement of the vehicle, and a lamp unit configured to irradiate light that forms a road pattern indicating the driving state of the vehicle to the rear of the vehicle such that the road pattern can be formed on at least one side of the vehicle. A control unit may be configured to control the lamp unit based on the detected state of the vehicle, wherein the luminous intensity of the lamp unit is substantially the same as, or greater than, the luminous intensity of the reversing lamp.

According to another aspect of the present invention, an automotive lamp, may include a detection unit configured to detect a state of a vehicle and lamp units configured to irradiate light that forms a road pattern indicating the state of the vehicle to the rear of the vehicle, the lamp units disposed on both sides of the rear of the vehicle and irradiate light that forms two road patterns on both sides of the rear of the vehicle.

According to the present invention, light for forming a road pattern indicating a reverse movement of a vehicle may be irradiated to at least one side of the rear of the vehicle while turning on a reversing lamp. Thus, approaching vehicles or pedestrians may recognize, or be prepared for, the reverse movement of the vehicle even when they are in a situation that prevent them from identifying the reversing lamp.

In some exemplary embodiments, according to the present invention, the road pattern that indicates the reverse movement of the vehicle, and a road pattern that indicates the presence of any risks, may be formed. Thus, the occurrence of an accident may be prevented in advance. Additionally, light for forming a road pattern may indicate an open door of the vehicle. Thus, approaching vehicles may easily identify any open door of the vehicle.

The effects of the present invention are not limited thereto, and other effects of the present invention can be apparently understood from the description of claims.

BRIEF DESCRIPTION OF THE DRAWINGS

The above and other aspects and features of the present invention will become more apparent by describing in detail exemplary embodiments thereof with reference to the attached drawings, in which.

Figure 1:
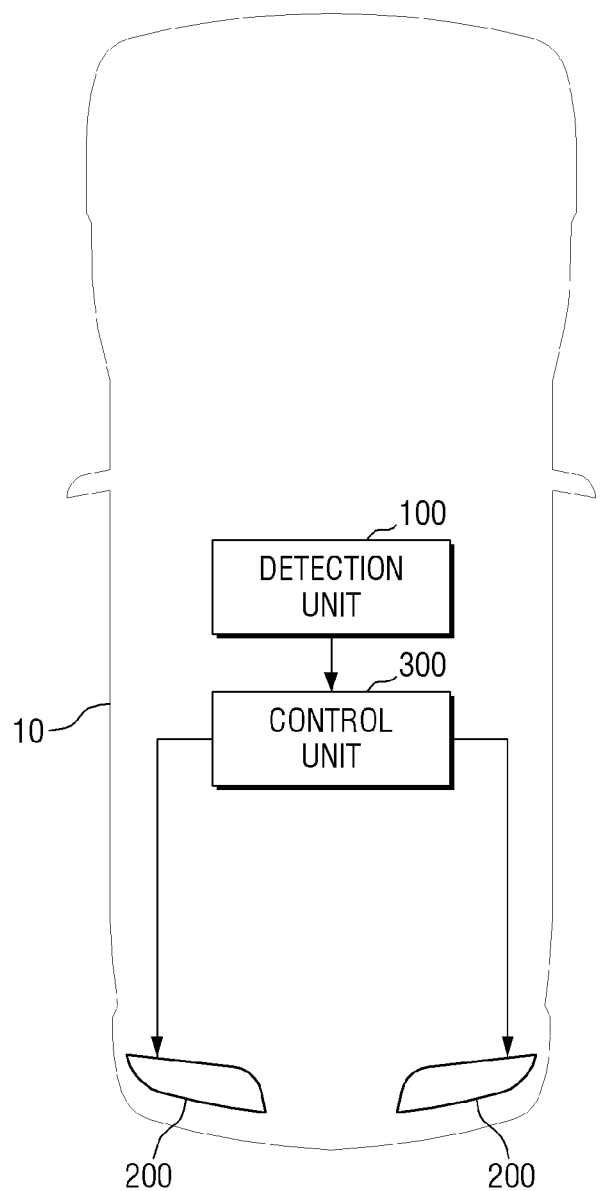
FIG. 1 schematically illustrates an automotive lamp in accordance with an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements. In some exemplary embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN.)

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An automotive lamp according to an embodiment of the present invention will hereinafter be described with reference to the accompanying drawings.

FIG. 1 schematically illustrates an automotive lamp in accordance with an exemplary embodiment of the present invention. Referring to FIG. 1, the automotive lamp 1 in accordance with the exemplary embodiment of the present invention may include a detection unit 100 configured to detect a driving state of a vehicle 10, at least one lamp unit 200 that may be installed at the rear of the vehicle 10 and irradiates light for forming road patterns indicating the driving state of the vehicle 10 to inform vehicles approaching from at least one side of the rear of the vehicle 10 of the driving state of the vehicle 10, and a control unit 300 configured to control road patterns based on the results of the detection performed by the detection unit 100.

The detection unit 100 may be configured to detect the state of the vehicle 10. In the exemplary embodiment of the present invention, the driving state of the vehicle 10 may include a reverse idle state (i.e., a state in which a reverse shift stage is selected but the vehicle 10 is still stopped), a reverse state, a door open state, and the like, but the present invention is not limited thereto. The detection unit 100 may be configured to detect various other states of the vehicle 10 that may cause an accident between the vehicle 10 and any vehicles approaching from at least one side of the rear of the vehicle 10.

Examples of the reverse state may include a reverse movement of the vehicle 10 in response to the selection of a reverse shift stage and a reverse movement of the vehicle 10 due to an external factor. Examples of the reverse movement of the vehicle 10 due to the external factor include an unintended reverse movement of the vehicle 10 on an inclined road. The detection unit 100 may include various sensors configured to detect the driving state of the vehicle 10. For example, the detection unit 100 may be configured to detect a reverse movement of the vehicle 10 based on a shift stage currently being selected or a traveling direction of the vehicle 10, and may also be configured to detect any open door of the vehicle 10 using a sensor disposed in each of the doors of the vehicle 10.

The lamp unit 200 may be installed at the rear of the vehicle 10 and may be configured to irradiate light that forms road patterns that indicates the state of the vehicle 10 based on the results of the detection performed by the detection unit 100. The embodiment of the present invention will hereinafter be described, taking, as an example, a case in which the lamp unit 200 may be installed on both sides of the rear of the vehicle 10 to irradiate light for forming road patterns on both sides of the rear of the vehicle 10.

Figure 2:
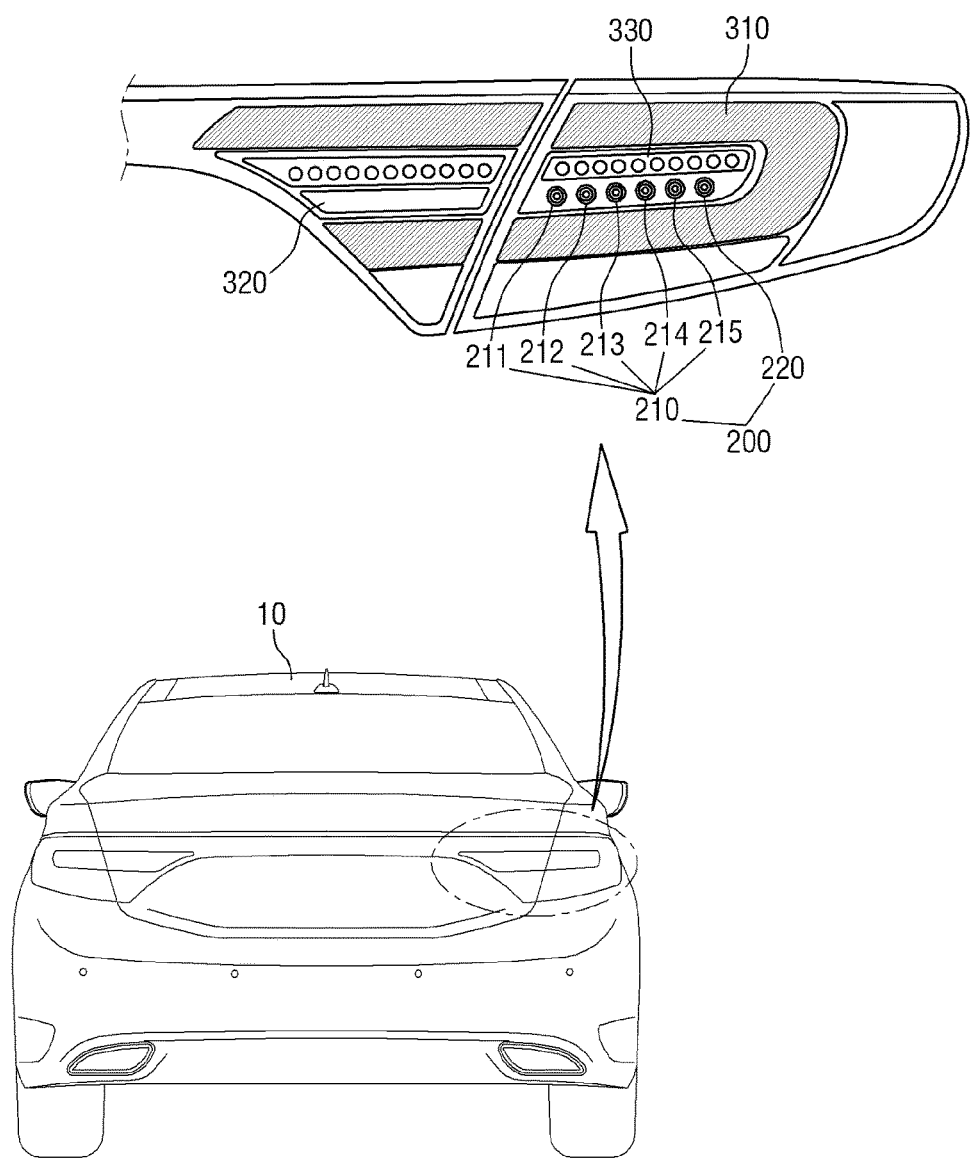
FIG. 2 schematically illustrates a lamp unit in accordance with the exemplary embodiment of the present invention.

For example, as illustrated in FIG. 2, the lamp unit 200 may be installed at the rear of the vehicle 10 together with various other lamps for various purposes, such as a stop lamp 310, a reversing lamp 320, a blinker 330, and the like. FIG. 2 illustrates an exemplary lamp arrangement, and may include the lamp unit 200, the stop lamp 310, the reversing lamp 320, the blinker 330, and the like, at one side of the rear of the vehicle 10, and the lamp arrangement of FIG. 2 may apply to the other side of the rear of the vehicle 10 with slight changes in the installation location and direction. When the vehicle 10 is reversing, the reversing lamp 320 may be turned on to inform ambient vehicles approaching from at least one side of the rear of the vehicle 10 of the reverse movement of the vehicle 10, thereby allowing the drivers of the approaching vehicles to be prepared for the reverse movement of the vehicle 10.

A vehicle approaching from the rear of the vehicle 10 may be prepared by checking the reversing lamp 320 of the vehicle 10. However, since a vehicle approaching from a rear left or rear right side of the vehicle 10 may not be able to easily check the reversing lamp 320, especially when there is a heavy vehicle or obstacle around, the likelihood of an accident may increase. Accordingly, the lamp unit 200 may be configured to irradiate light that forms road patterns that indicate a reverse state of the vehicle 10 together with the reversing lamp 320 when the vehicle 10 is reversing, thereby allowing not only an ambient vehicle approaching from behind the vehicle 10, but also an ambient vehicle approaching from the rear left or rear right side of the vehicle 10 to easily identify, and be prepared for, the reverse movement of the vehicle 10 from road patterns.

The lamp unit 200 and the reversing lamp 320 may both indicate the reverse movement of the vehicle 10, and thus need to irradiate light of the same color. For example, the lamp unit 200 and the reserving lamp 320 may be configured to share and use the same lens (e.g., the same outer lens) together. In other words, a plurality of lamps for various purposes, such as the lamp unit 200 and the reversing lamp 320, and the stop lamp 310 and the blinker 330, may be installed at the rear of the vehicle 10 to be disposed in a plurality of spaces, respectively, that are divided from one another. Further, a plurality of lenses corresponding to the plurality of spaces, respectively, may be integrally formed through a double injection process.

In particular, when the lamp unit 200 and the reversing lamp 320 are installed at a relatively large distance apart from each other, separate lenses need to be provided for the lamp unit 200 and for the reversing lamp 320. Accordingly, additional lens fabrication and assembly processes may be needed. Thus, to improve the convenience of lens molding, lens assembly, and lens fabrication processes without compromising the exterior design of the automotive lamp 1, the lamp unit 200 and the reversing lamp 320 may preferably be installed together in a space that corresponds to a single lens at an interval of 75 mm or less.

The lamp unit 200 and the reversing lamp 320 may be installed in a space that corresponds to a lens having a white color, a blue color, or a yellow color to indicate a reverse movement of the vehicle 10, but the present disclosure is not limited thereto. In other words, a transparent lens may be used for the lamp unit 200 and the reversing lamp 320 when light emitted from the lamp unit 200 and the reversing lamp 320 already has a required color. The lamp unit 200 and the reversing lamp 320 may be disposed adjacent to each other to share the same lens together. For example, the lamp unit 200 and the reversing lamp 320 may be installed on a common board together, or may be disposed in the same lamp housing together.

Figure 3:
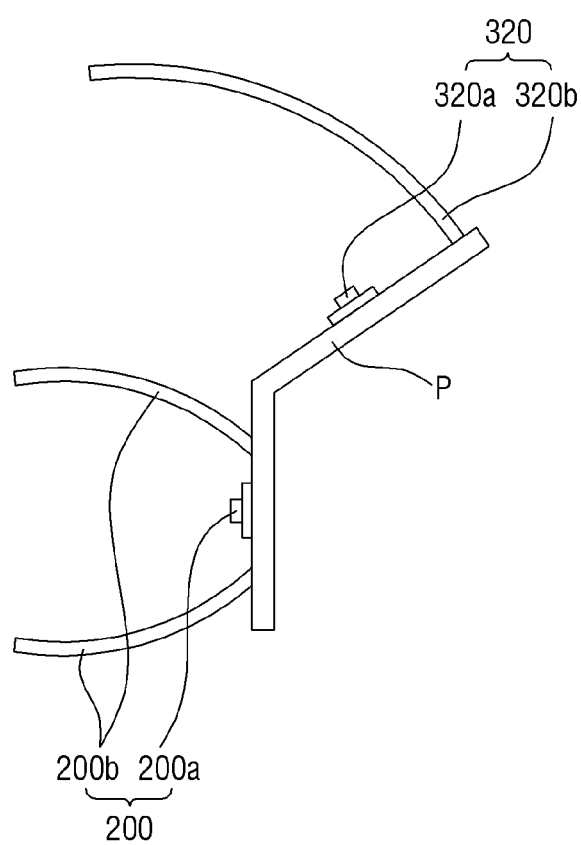
FIGS. 3 and 4 schematically illustrate examples of the arrangement of a lamp unit and a reversing lamp in accordance with the exemplary embodiment of the present invention.
Figure 4:
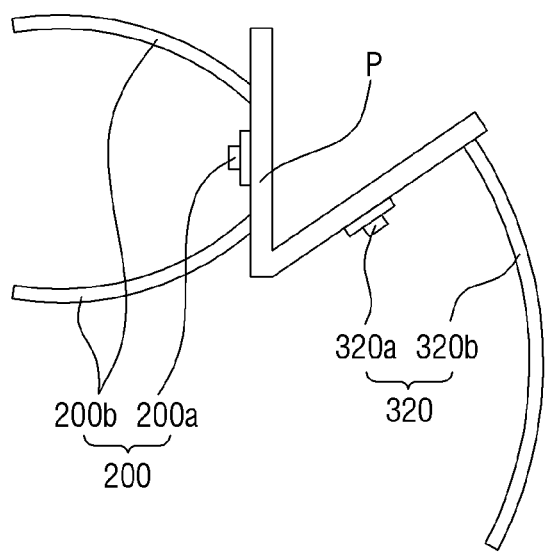

For example, referring to FIGS. 3 and 4, the lamp unit 200 and the reversing lamp 320 may be installed on a common board P together. The lamp unit 200 as illustrated in FIGS. 3 and 4 may include a light source 200a and a reflector 200b. The reversing lamp 320 is illustrated in FIGS. 3 and 4 may include a light source 320a and a reflector 320b. However, the present disclosure is not limited to the exemplary embodiments of FIGS. 3 and 4. In other words, when the automotive lamp 1 is a direct lighting-type automotive lamp, the reflectors 200b and 320b may not be provided.

It may be understood that the light source 200a and the reflector 200b of the lamp unit 200 of FIG. 3 or 4 are included in any one of a plurality of light source components 211 through 215 that will be described later, and that the light source components 211 through 215 may have basically the same structure with slight differences in their installation location or direction. Similarly, it may be understood that the light source 320a and the reflector 320b of FIG. 3 or 4 are included in at least one of a plurality of light source components included in the reversing lamp 320. The embodiment of the present invention will hereinafter be described, taking, as an example, a case in which the reversing lamp 320, like the lamp unit 200, includes a plurality of light source components.

As illustrated in FIGS. 3 and 4, the lamp unit 200 and the reversing lamp 320 may be disposed vertically or horizontally with respect to each other, rather than being disposed on the same line, to prevent light emitted from the lamp unit 200 and light emitted from the reversing lamp 320 from interfering with each other. The luminous intensity of the lamp unit 200 may be the same as, or greater than, the luminous intensity of the reversing lamp 320. Accordingly, the lamp unit 200 is required to reach a relatively long distance from the vehicle 10, compared to the reversing lamp 320, and may not be able to provide a sufficiently high illuminance for road patterns if it has a lower luminous intensity than the reversing lamp 320.

The lamp unit 200 may preferably have a luminous intensity of about 4,300 cd to 13,000 cd in consideration of the surroundings such as the ambient brightness. For example, the illuminance of a road in the evening when the field of vision of the vehicle 10 gradually decreases and thus there is the need to indicate the state of the vehicle 10 with road patterns is about 100 lux based on the natural light, which may be a highest illuminance of all situations that require the display of road patterns. In other words, in order to be sufficiently visible and distinct from a road, road patterns are required to have a brightness of at least 200 lux, and for this, the lamp unit 200 may have a luminous intensity of at least 4,300 cd.

Considering the standard illuminance of a basement parking lot or a street light, the illuminance of a road, particularly, the illuminance of the ground, may be a maximum of about 100 lux. In particular, road patterns may preferably have a brightness of at least 200 lux to be sufficiently visible and distinct from the road. The lamp unit 200 that may have a luminous intensity of at least 4,300 cd means that road patterns formed by the lamp unit 200 may have an illuminance of at least 200 lux at their most distant components from the vehicle 10, and the luminous intensity of the lamp unit 200 will be described later in further detail.

Referring again to FIG. 2, the lamp unit 200 may include a first lamp unit 210 and a second lamp unit 220. The first lamp unit 210 may include a plurality of light source components 211 through 215. A desired road pattern may be formed at the rear of the vehicle 10 by adjusting the size, the installation angle, and the focal length of each of the light source components 211 through 215. The first lamp unit 210 is illustrated as including five light source components 211 through 215, but the present invention is not limited thereto. In other words, the number of light sources included in the first lamp unit 210 may vary, as necessary, based on the intended use of the first lamp unit 210.

Figure 5:
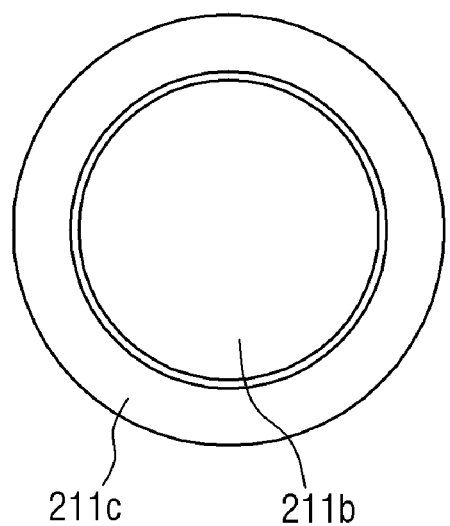
FIG. 5 is an exemplary front view of a light source part of a first lamp unit of the lamp unit in accordance with the exemplary embodiment of the present invention.
Figure 6:
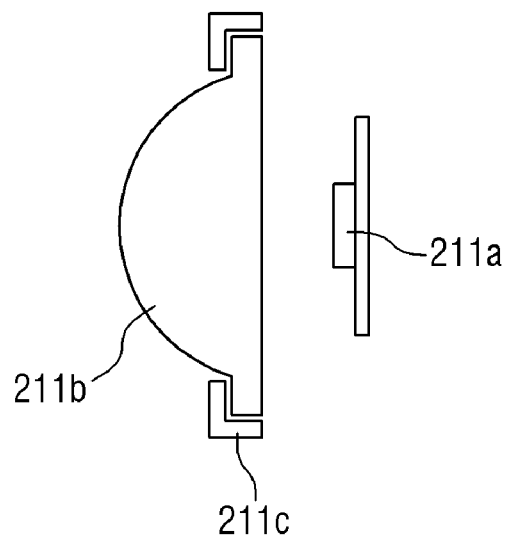
FIG. 6 is an exemplary side view of the light source part of the first lamp unit in accordance with the exemplary embodiment of the present invention.

FIG. 5 is a front view of a light source part of the first lamp unit in accordance with the exemplary embodiment of the present invention. FIG. 6 is a side view of the light source part of the first lamp unit in accordance with the exemplary embodiment of the present invention. More specifically, one of the light source components 211 through 215 included in the first lamp unit 210, i.e., the light source part 211, is illustrated in FIGS. 5 and 6 as an example, and the other non-illustrated light source components, i.e., the light source components 212 through 215 may have the same structure as the light source part 211 of FIGS. 5 and 6, except for slight differences in their size, installation angle, and irradiation angle from the light source part 211.

Referring to FIGS. 5 and 6, the light source part 211 may include a light source 211a, a lens 211b, and a housing 211c in which the lens 211b is installed. A light-emitting diode (LED) may be used as the light source 211a, but the present invention is not limited thereto. The name of the manufacturer of the light source part 211 may be displayed on one surface of the housing 211c surrounding the lens 211b.

Figure 7:
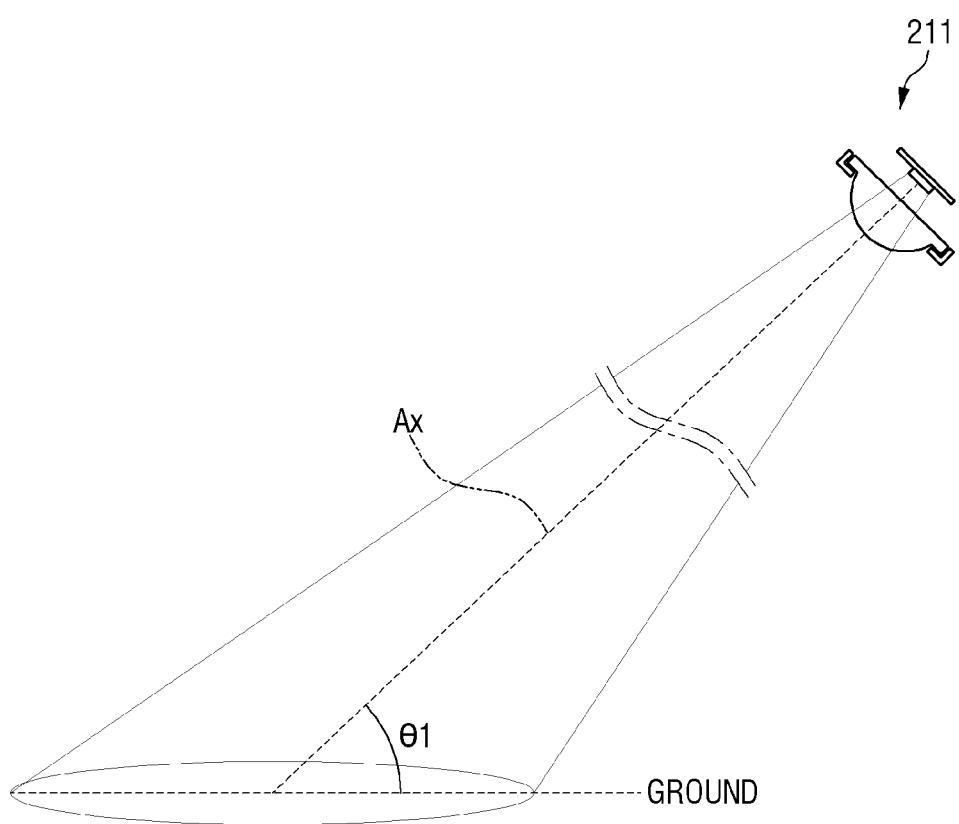
FIGS. 7 and 8 schematically illustrate irradiation angles of the light source part of the first lamp unit in accordance with the exemplary embodiment of the present invention.
Figure 8:
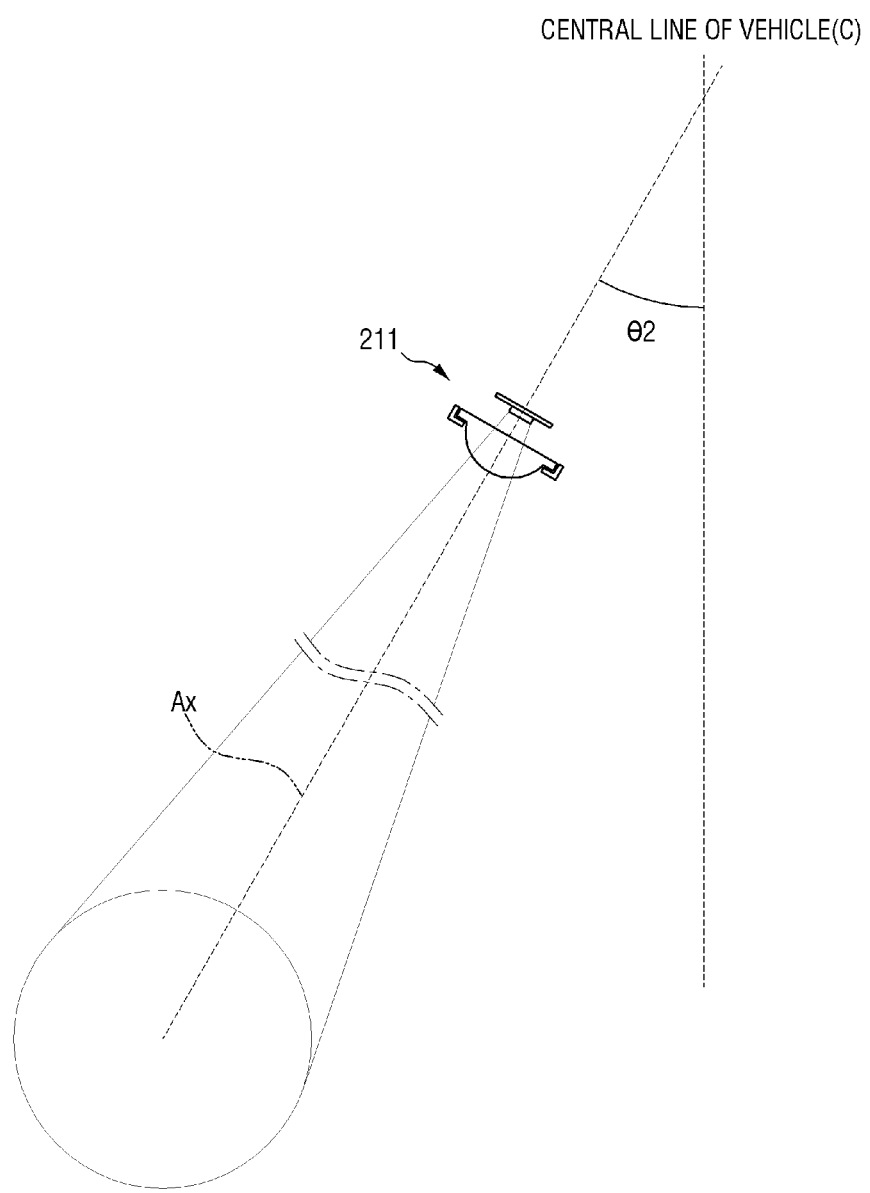

Referring to FIGS. 7 and 8, each of the light source components 211 through 215 of the first lamp unit 210 may be installed such that an optical axis Ax thereof can have a vertical irradiation angle $\theta 1$ with respect to the ground and can have a horizontal irradiation angle $\theta 2$ with respect to a central line C of the vehicle 10. Accordingly, a desired road pattern may be formed on the ground at the rear of the vehicle 10. The angles that each of the light source components 211 through 215 forms with the ground and the central line C of the vehicle 10, respectively, i.e., the angles $\theta 1$ and $\theta 2$, may be uniform for all the light source components 211 through 215 or may differ among the light source components 211 through 215 based on the installation locations of the light source components 211 through 215.

Figure 9:
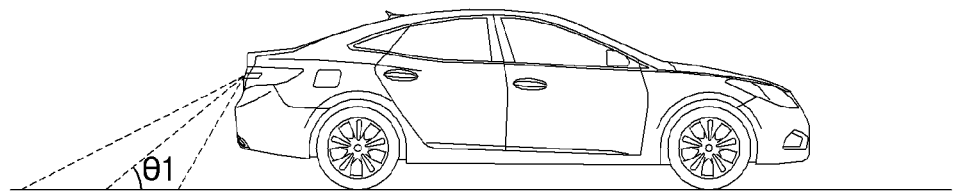
FIG. 9 schematically illustrate a vertical irradiation angle in accordance with the exemplary embodiment of the present invention.

For example, referring to FIG. 9, the angle that a light source part irradiating light to a closer area than the light source part 211 to the vehicle 10 forms with the ground may become greater than the angle $\theta 1$ of FIG. 7, and the angle that a light source part irradiating light to a more distant area than the light source part 211 from the vehicle 10 may become less than the angle $\theta 1$ of FIG. 7.

Figure 10:
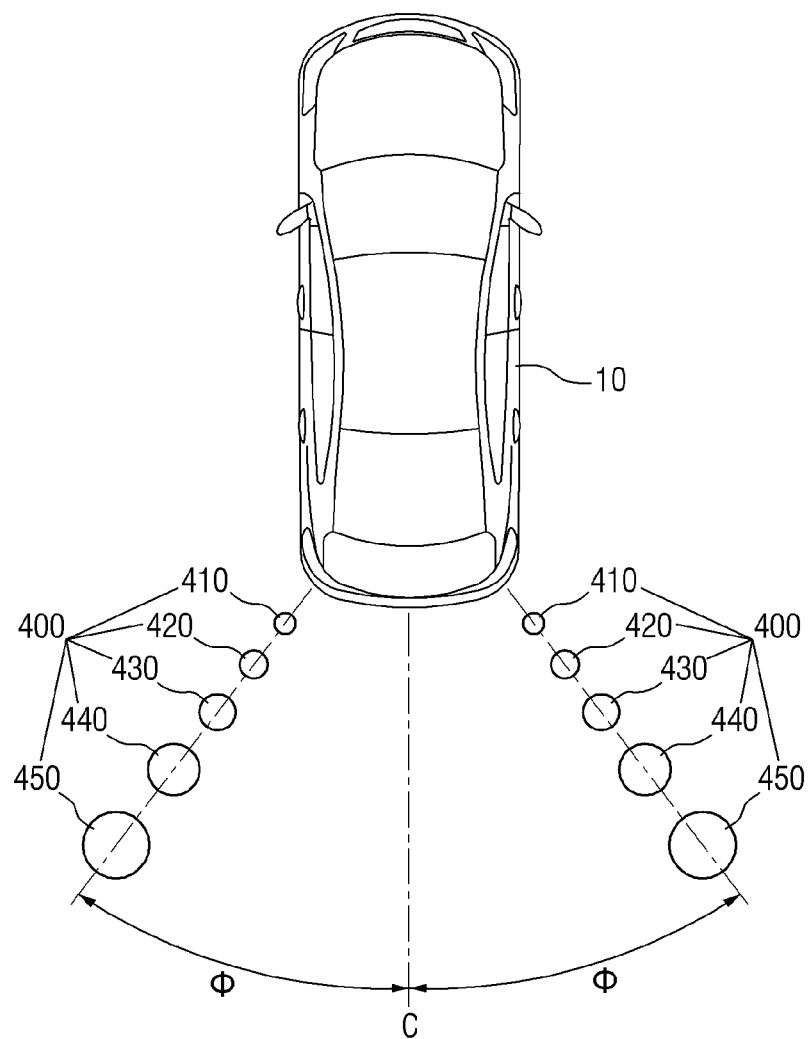
FIG. 10 schematically illustrates road patterns formed by the first lamp unit in accordance with the exemplary embodiment of the present invention.

FIG. 10 schematically illustrates road patterns formed by the first lamp unit of the lamp unit in accordance with the embodiment of the present invention. Referring to FIG. 10, a road pattern 400 formed by light irradiated from the first lamp unit 210 may include a plurality of irradiation patterns 410, 420, 430, 440, and 450, which are arranged at one side of the rear of the vehicle 10 by adjusting the size, installation angle, focal length, and the like of each of the light source components 211 through 215 included in the first lamp unit 210.

In this case, the size, interval, and shape or the like of the irradiation patterns 410, 420, 430, 440, and 450 included in the road pattern 400 may vary as necessary. In the exemplary embodiment of the present invention, the irradiation patterns 410, 420, 430, 440, and 450 included in the road pattern 400 may be circular and may gradually become larger away from the vehicle 10. However, the present invention is not limited thereto. The irradiation patterns 410, 420, 430, 440, and 450 may have various shapes, other than the circular shape set forth herein, and may gradually become smaller away from the vehicle 10 or may be uniform in size regardless of their distance from the vehicle 10.

The exemplary embodiment of the present invention has been described, taking, as an example, a case in which the road pattern 400 includes a plurality of irradiation patterns, i.e., the irradiation patterns 410, 420, 430, 440, and 450, but the present invention is not limited thereto. In other words, the road pattern 400 may include a single irradiation pattern. The irradiation patterns 410, 420, 430, 440, and 450 may all be formed at the same time or may be sequentially formed in a particular order. Sequentially forming the irradiation patterns 410, 420, 430, 440, and 450 may be understood as sequentially turning on the light source components 211 through 215.

Figure 11:
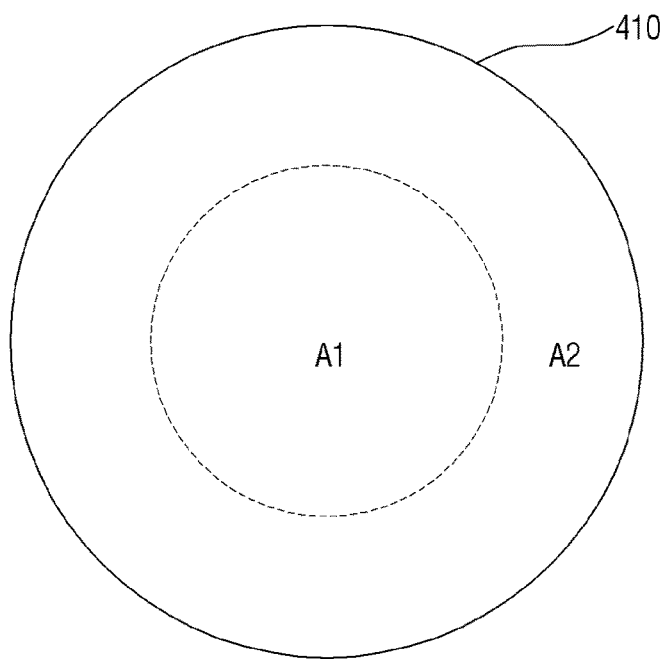
FIG. 11 schematically illustrates irradiation patterns in accordance with the embodiment of the present invention.

FIG. 11 schematically illustrates irradiation patterns in accordance with the embodiment of the present invention. More specifically, FIG. 11 illustrates one of the irradiation patterns 410, 420, 430, 440, and 450 included in the road pattern 400, i.e., the irradiation pattern 410, but the other-non-illustrated irradiation patterns, i.e., the irradiation patterns 420, 430, 440, and 450, may be the same as the irradiation pattern 410 except for slight differences in their size and location from the irradiation pattern 410.

Referring to FIG. 11, the irradiation pattern 410 may have different brightnesses from a central area A1 to an edge area A2 thereof. For example, the irradiation pattern 410 may be brighter in the central area A1 than in the edge area A2, but the present invention is not limited thereto. In other words, the irradiation pattern 410 may be brighter in the edge area A2 than in the central area A1. FIG. 11 illustrates an example in which the irradiation pattern 410 may be divided into two areas, but the present invention is not limited thereto. For example, the irradiation pattern 410 may be divided into more than two areas, in which case, the brightness of the irradiation pattern 410 may be uniform throughout the entire irradiation pattern 410 or may differ among the more than two areas.

Referring again to FIG. 10, the road pattern 400 may be formed at both sides of the central line C of the vehicle 10 to have a predetermined angle $\Phi$ with respect to the central line C of the vehicle 10. The angle $\Phi$ between the central line C of the vehicle 10 and the road pattern 400 may be set in consideration of the visibility of the road pattern 400 to vehicles approaching from at least one side of the rear of the vehicle 10, may be set by the manufacturer through tests, or may be arbitrarily set by the driver of the vehicle 10, but the present invention is not limited thereto. In the exemplary embodiment of FIG. 10, the road pattern 400 may be formed on both sides of the rear of the vehicle 10, but the present invention is not limited thereto. The road pattern 400 may be formed on only one side of the rear of the vehicle 10 based on the reversing direction of the vehicle 10.

The light source components 211 through 215 included in the first lamp unit 210 are aligned in a horizontal direction, as illustrated in FIG. 2, and the road pattern 400 is formed to have the predetermined angle $\Phi$ with respect to the central line C of the vehicle 10, as illustrated in FIG. 10. In the exemplary embodiment of the present invention, a desired road pattern may be formed by adjusting the installation location and installation angle of each of the light source components 211 through 215 of the first lamp unit 210, as illustrated in FIGS. 7 and 8. The angle that the road pattern 400 forms with the central line C of the vehicle 10, i.e., the angle $\Phi$, may be understood as the angle $\theta 2$ of FIG. 8.

The light source components 211 through 215 of the first lamp unit 210 is illustrated in FIG. 2 as being aligned in the horizontal direction, but the present invention is not limited thereto. In particular, the light source components 211 through 215 of the first lamp unit 210 may be aligned in various directions according to the layout of the automotive lamp 1. When the alignment direction of the light source components 211 through 215 of the first lamp unit 210 is changed to form the road pattern 400 of FIG. 10, the installation angle or the like of the light source components 211 through 215 of the first lamp unit 210 may be changed accordingly.

As mentioned above, the lamp unit 200 may be configured to allow the most distant part of the road pattern 400 from the vehicle 10, i.e., the irradiation pattern 450, which is formed at a more distant location than the other irradiation patterns, i.e., the irradiation patterns 410, 420, 430, and 440, from the vehicle 10, to have an illuminance of at least 200 lux. Additionally, the light source components 211 through 215 forms the irradiation pattern 450 and may have a luminous intensity greater than 4,300 cd. In other words, at any given luminous intensity, light irradiated to a most distant location possible has a lowest illuminance. In a case in which light is irradiated, from a maximum installation height of about 1,200 mm for the lamp unit 200, with a vertical irradiation angle of about $\theta 1$ of 15 degrees, the distance from the lamp unit 200 to the ground may be about 4,636 mm. In particular, in order for the most distant part of the road pattern 400 to have an illuminance of 200 lux or greater, the minimum luminous intensity of the lamp unit 200, which is an illuminance multiplied by the square of the distance in meters, may need to be greater than about 4,300 cd.

The maximum installation height for the lamp unit 200 may be understood as the height of whichever of the light source components 211 through 215 of the first lamp unit 200 is located at a highest place, may be set to about 1,200 mm because when it is greater than 1,200 mm, the lamp unit 200 may fall outside the field of vision of the driver of the vehicle 10, and thus, the visibility of the lamp unit 200 may be lowered. If the luminous intensity of the lamp unit 200 is too high, the road pattern 400 may be reflected to cause glare to vehicles or pedestrians. Thus, the lamp unit 200 may preferably have a luminous intensity lower than 13,000 cd. For example, light reflected from a wet road in the rain may cause glare to ambient vehicles or pedestrians. To prevent this, the lamp unit 200 may preferably have a luminous intensity lower than 13,000 cd.

The road pattern 400 may have the horizontal irradiation angle $\Phi$ with respect to the central line C of the vehicle 10 and may have the vertical irradiation angle $\theta 1$ with respect to the ground. In the exemplary embodiment of the present invention, the horizontal irradiation angle $\Phi$ and the vertical irradiation angle $\theta 1$ may both be acute angles. More specifically, the horizontal irradiation angle $\Phi$ may be 20 degrees to 45 degrees, and the vertical irradiation angle $\theta 1$ may be 15 degrees to 45 degrees.

In the exemplary embodiment of the present invention, the horizontal irradiation angle $\Phi$ and the vertical irradiation angle $\theta 1$ may be set to a range of 20 degrees to 45 degrees and a range of 15 degrees to 45 degrees, respectively, in consideration of the visibility of the road pattern 400 to approaching vehicles or pedestrians. More specifically, in the exemplary embodiment of the present invention, the horizontal irradiation angle $\Phi$ may be set to a range of about 20 degrees to 45 degrees in consideration of the visibility of the road pattern 400 to ambient vehicles or pedestrians, which is affected by the range of rotation of the vehicle 10, the presence of any obstacle near the vehicle 10, and the size of the ambient vehicles.

Figure 12:
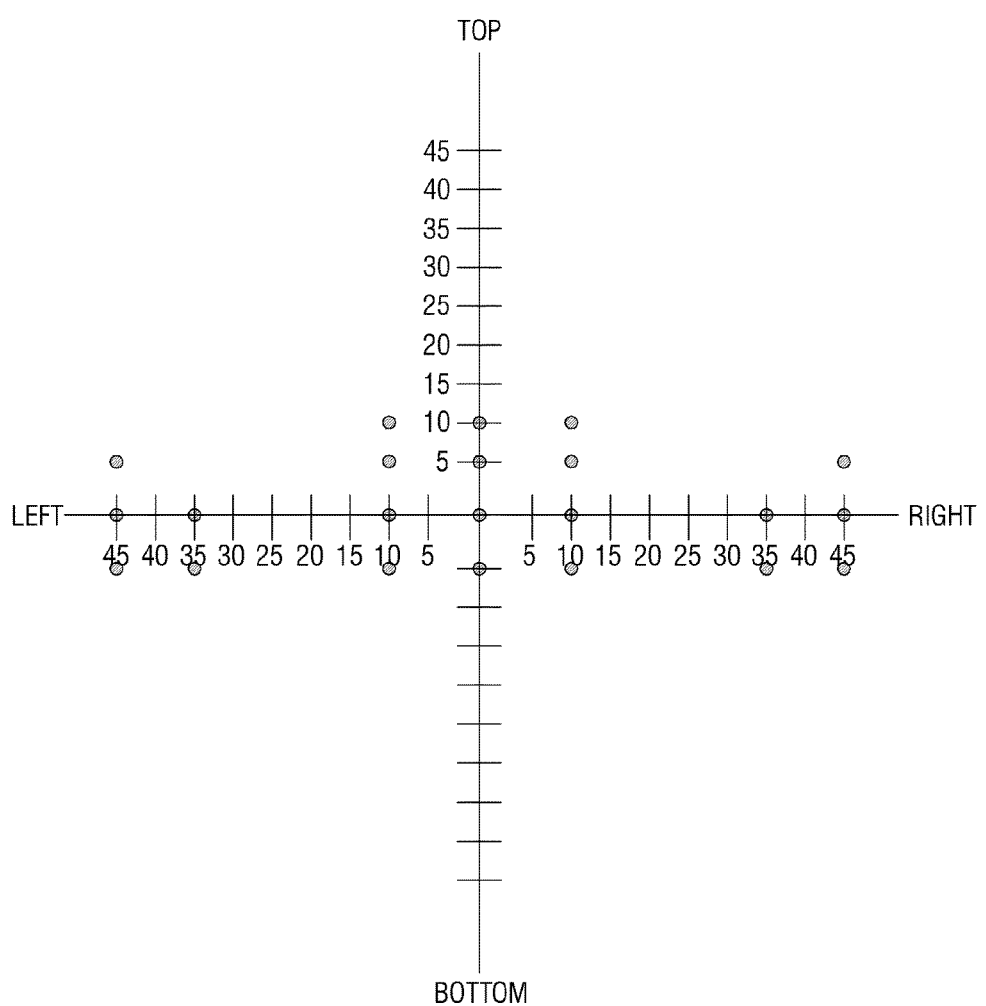
FIG. 12 schematically illustrates irradiation areas in accordance with the exemplary embodiment of the present invention.

Referring to FIG. 12, in consideration that the irradiation area of the reversing lamp 320 may cover a range from 10 degrees up to 10 degrees down from the reversing lamp 320, the vertical irradiation angle $\theta 1$ may be set to 15 degrees or greater, which is about 5 degrees greater than the angle between the reversing lamp 320 and the top or bottom of the irradiation area of the reversing lamp 320, to prevent light interference. The vertical irradiation angle $\theta 1$ may also be set to less than 45 degrees to prevent light irradiation from being limited by a structure such as the bumper at the front or the rear of the vehicle 10 or a housing in the lamp unit 200 and to prevent the state of the vehicle 10 from being hardly recognizable because of the road pattern 400 being formed too close to the vehicle 10. The smaller the vertical irradiation angle θ1, the more similar the vertical irradiation angle θ1 becomes to the angle between the ground and the optical axis Ax of whichever of the light source components 211 through 215 forms the most distant part of the road pattern 400.

Figure 13:
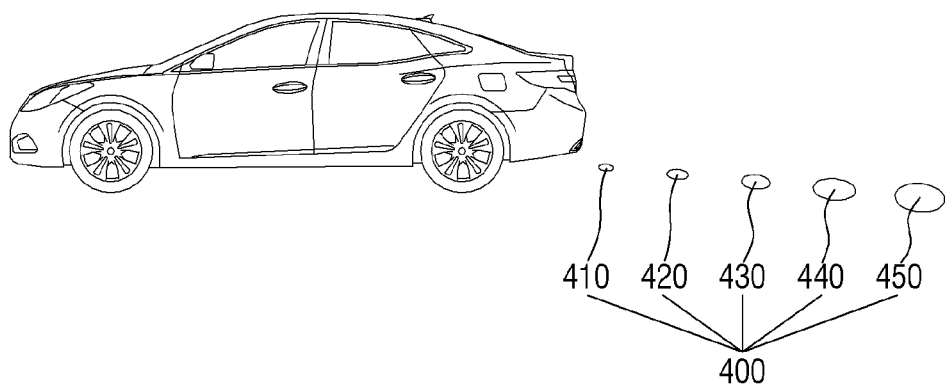
FIGS. 13 and 14 schematically illustrate road patterns in accordance with the exemplary embodiment of the present invention.
Figure 14:
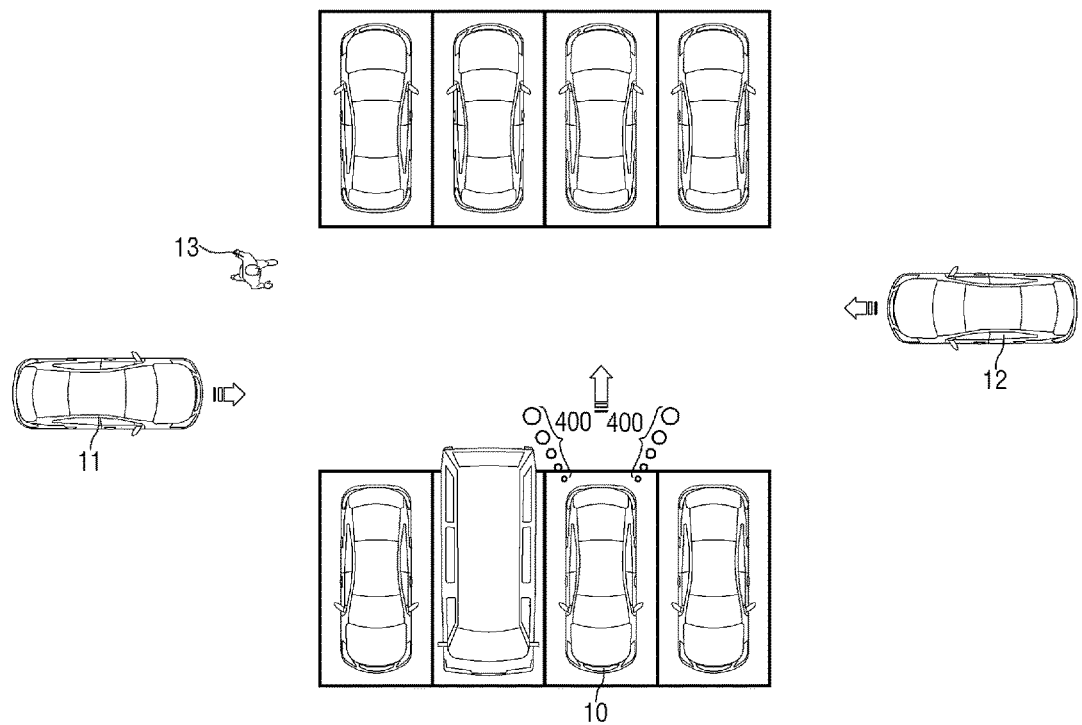

When the horizontal irradiation angle Φ of the lamp unit 200 is less than about 20 degrees, the road pattern 400 may appear similar to a traffic lane, and thus, the directionality of the road pattern 400 may become hardly recognizable to ambient vehicles or pedestrians, as illustrated in FIG. 13, especially when the road pattern 400 is viewed from a side of the vehicle 10. Conversely, when the horizontal irradiation angle Φ of the lamp unit 200 is greater than about 45 degrees, the road pattern 400 may be hidden from view by any obstacle near the vehicle 10, as illustrated in FIG. 14. Thus, the horizontal irradiation angle Φ of the lamp unit 200 may preferably be about 20 degrees to 45 degrees. Referring to FIG. 14, if a large vehicle is parked next to the vehicle 10 and the horizontal irradiation angle Φ of the road pattern 400 is greater than 45 degrees, it may be difficult to properly inform ambient vehicles 11 and 12 and a pedestrian 13 of the moving direction of the vehicle 10. Thus, the angle that the road pattern 400 forms with the central line C of the vehicle 10 may preferably be smaller than about 45 degrees.

Figure 15:
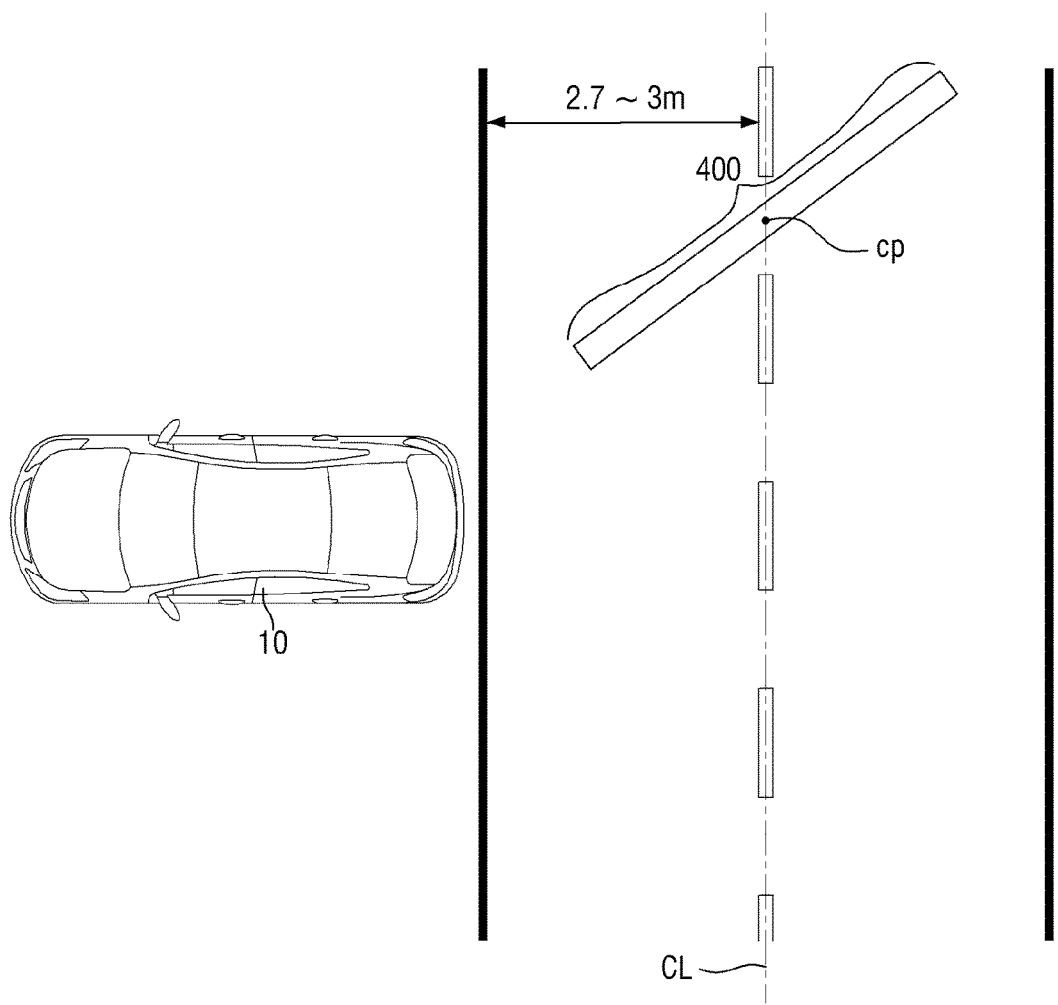
FIG. 15 schematically illustrates the locations of road patterns in accordance with the exemplary embodiment of the present invention.

Referring to FIG. 15, when the vehicle 10 is reversing from a state of being parked on the side of a road, the road pattern 400 may be formed on or over a centerline CL of a road, in which case, approaching vehicles or pedestrians may not be able to identify the state of the vehicle 10 from the road pattern 400. Thus, the road pattern 400 may preferably be formed such that a center cp of the road pattern 400 may be about 2.7 m to 3 m from an axis perpendicularly intersecting the lengthwise direction of the vehicle 10 at the rear end of the vehicle 10. The distance from the center cp of the road pattern 400 to the axis perpendicularly intersecting the lengthwise direction of the vehicle 10 at the rear end of the vehicle 10 may be set to a range of about 2.7 m to 3 m because the minimal width of a typical vehicle ranges from about 2.7 m to about 3 m. Thus, the distance from the center cp of the road pattern 400 to the axis perpendicularly intersecting the lengthwise direction of the vehicle 10 at the rear end of the vehicle 10 may vary based on the minimum width of the vehicle 10.

FIG. 15 illustrates an example in which the road pattern 400 includes a single irradiation pattern, but the present invention is not limited thereto and may also apply to a case in which the road pattern 400 includes the irradiation patterns 410, 420, 430, 440, and 450.

Referring again to FIG. 2, the lamp unit 200 may include the first lamp unit 210 and may further include the second lamp unit 220, which is installed at one side of the first lamp unit 210 and may inform vehicles approaching from at least one side of the rear of the vehicle 10 of the driving state of the vehicle 10 by irradiating light having a road pattern such as a symbol or a pattern in cooperation with the first lamp unit 210. For example, the first lamp unit 210 may be configured to irradiate light of a road pattern each consisting of an array of certain shapes, and the second lamp unit 220 may irradiate light having a road pattern such as a warning symbol or pattern indicating the presence of an accident risk. When the vehicle 10 includes a particular device (e.g., a warning light) that may serve as the second lamp unit 220, the second lamp unit 220 may not be provided. The second lamp unit 220 may operate independently of the first lamp unit 210.

Figure 16:
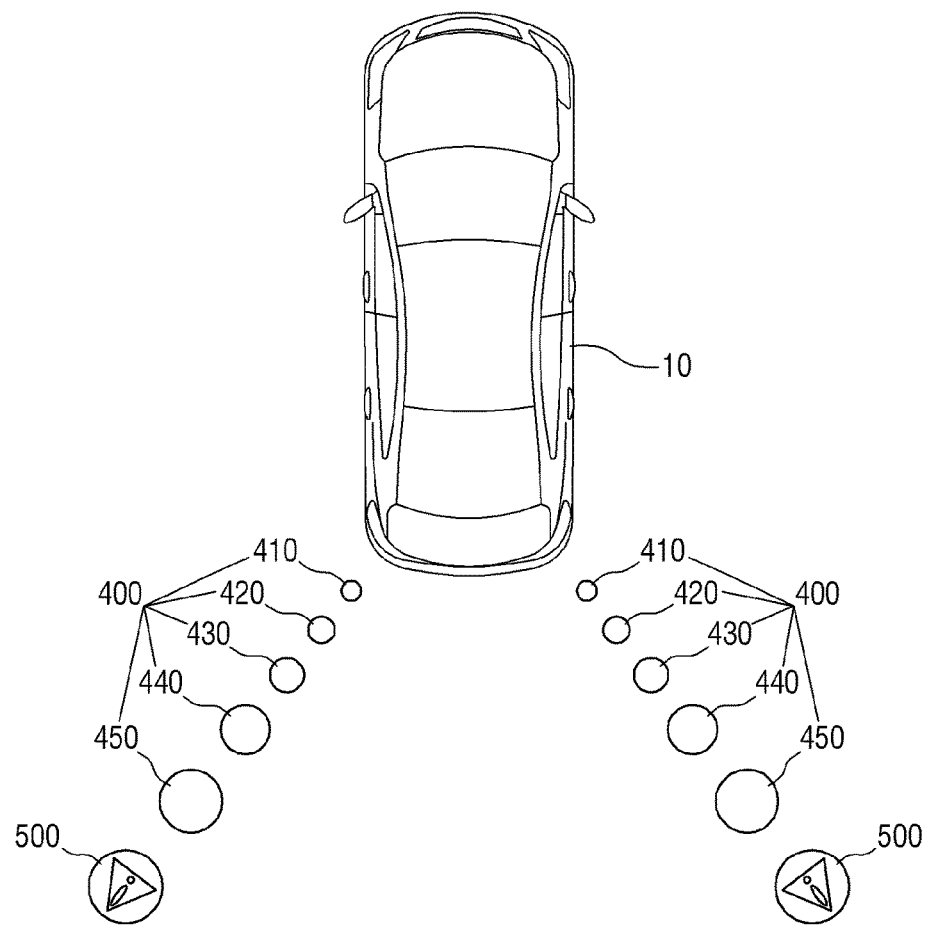
FIG. 16 schematically illustrates road patterns formed by the first and second lamp units of the lamp unit in accordance with the exemplary embodiment of the present invention.

FIG. 16 schematically illustrates road patterns formed by the first and second lamp units of the lamp unit in accordance with the exemplary embodiment of the present invention. Referring to FIG. 16, the road pattern 400 may be formed by the first lamp unit 210 on at least one side of the rear of the vehicle 10, and a road pattern 500 may be formed, as a warning symbol or pattern for ambient vehicles, by the second lamp unit 220 on one side of the road pattern 400 formed by the first lamp unit 210. The shape of the road pattern 500 formed by the second lamp unit 220 may be selected by the driver of the vehicle 10 with a switch or the like installed in the vehicle 10 according to the circumstances.

Referring again to FIG. 1, the control unit 300 may be configured to control the lamp unit 200 according to the results of the detection performed by the detection unit 100 and may be configured to control the road pattern 400. The control unit 300 may be configured to control the lamp unit 200 and the reversing lamp 320 to operate in line with each other. In the embodiment of the present invention, the control unit 300 may turn on or off the lamp unit 200 and the reversing lamp 320 at the substantially simultaneously, and may turn off the lamp unit 200 when the reversing lamp 320 is turned off due to failure detected from one of the light source components thereof.

Figure 18:
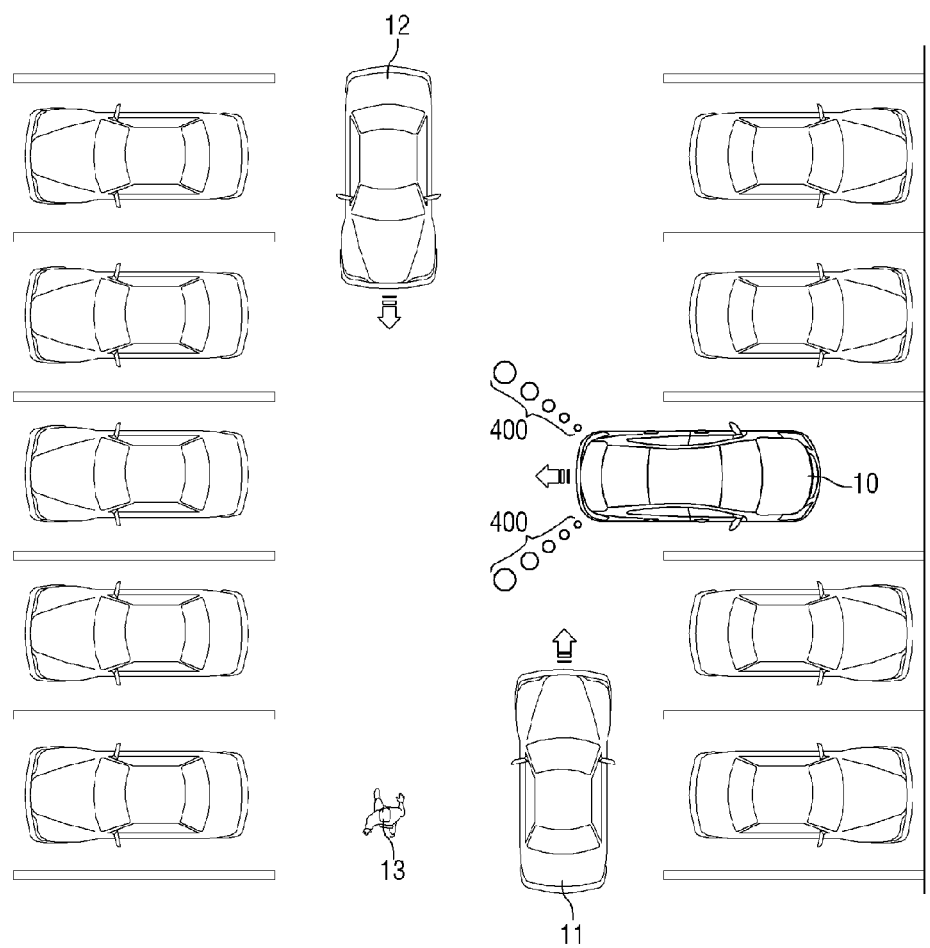

More specifically, in the exemplary embodiment of the present invention, the reversing lamp 320 may include a plurality of light source components. Thus, when one of the light source components of the reversing lamp 320 is broken and thus the reversing lamp 320 is turned off, the lamp unit 200 may also be turned off. In a case in which the driver selects a shift stage for a reverse movement of the vehicle 10 but the vehicle 10 is still stopped, the control unit 300 may be configured to control the road pattern 400 formed by the first lamp unit 210 to flicker and may be configured to control the road pattern 400 to be continuously turned on while the vehicle 10 is reversing, as illustrated in FIG. 18.

Figure 17:
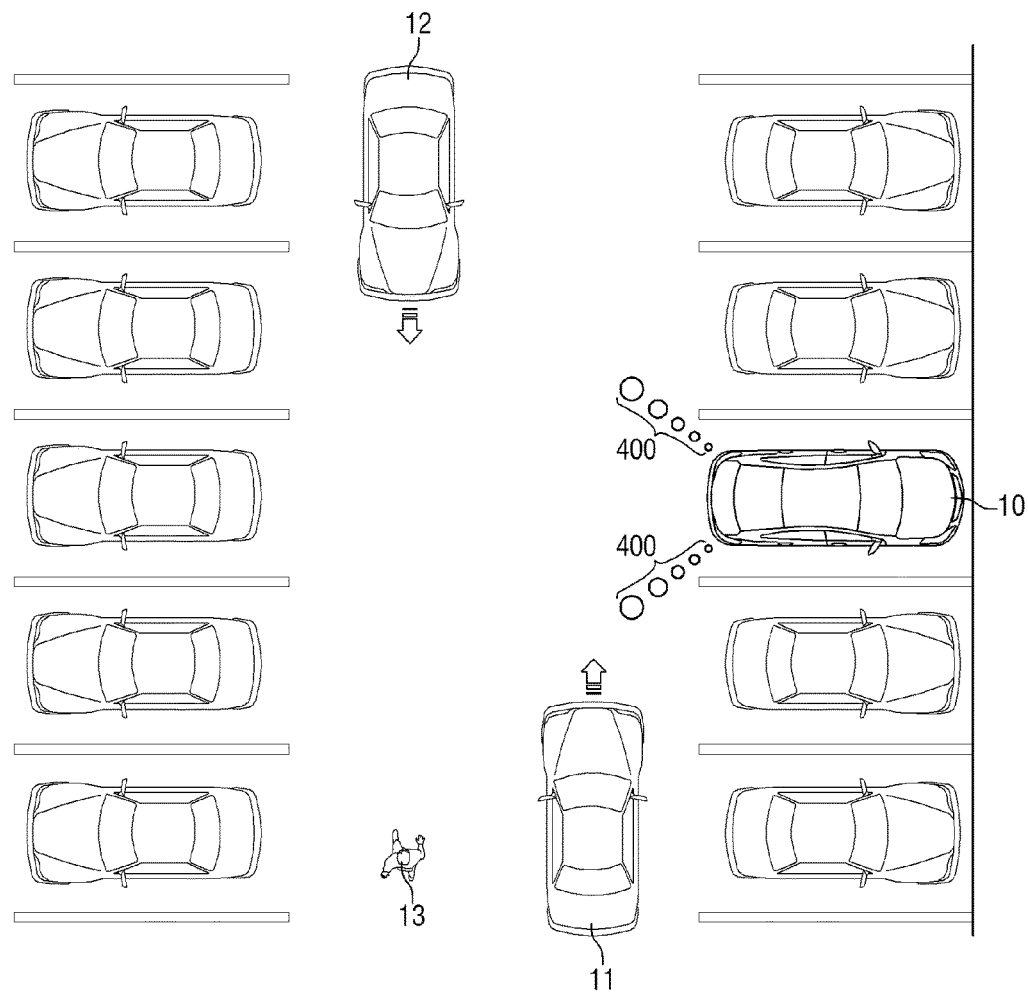
FIGS. 17 and 18 schematically illustrate road patterns in a reverse movement of a vehicle in accordance with the exemplary embodiment of the present invention.

In particular, when the shift stage for a reverse movement of the vehicle 1 is selected but the vehicle 10 is still stopped, the control unit 300 may be configured to control the road pattern 400 to flicker, as illustrated in FIG. 17. Conversely, while the vehicle 10 is reversing, the control unit 300 may be configured to control the road pattern 400 to be continuously turned on, as illustrated in FIG. 18. Allowing the road pattern 400 to flicker, as illustrated in FIG. 17, and allowing the road pattern 400 to be continuously turned on, as illustrated in FIG. 18, are for forming different road patterns for different situations and thereby allowing the drivers of approaching vehicles to distinguish one situation from another situation, but the present invention is not limited thereto. In other words, in both situations of FIGS. 17 and 18, the road patterns 400 and 500 may both be made to flicker or to be continuously turned on.

Accordingly, the ambient vehicles 11 and 12 or the pedestrian 13 approaching from at least one side of the rear of the vehicle 10 may be informed of, and prepared for, the reverse movement of the vehicle 10 in advance in response to the road pattern 400 flickering, and may take an appropriate action in response to the vehicle 10 beginning to reverse.

The control unit 300 may include a sensor, such as an illumination sensor, which may be configure to sense the ambient brightness of the vehicle 10, and may be configured to turn on or off the lamp unit 200 based on the sensed ambient brightness. In other words, the control unit 300 may be configured turn on or off the lamp unit 200 by comparing the sensed ambient brightness with a reference brightness. For example, when the sensed ambient brightness is greater than the reference brightness, the control unit 300 may determine that the road pattern 400 formed by the lamp unit 200 have a low visibility and may thus turn off the lamp unit 200.

The exemplary embodiment of the present invention has been described, taking, as an example, a case in which the control unit 100 may be configured to control the lamp unit 200 and the reversing lamp 320 during the reverse movement of the vehicle 10, but the present invention is not limited thereto. In other words, in order to prevent an accident that may be caused by vehicles approaching from at least one side of the rear of the vehicle 10 when the driver opens a door of the vehicle 10 and exits the vehicle 10, the control unit 300 may be configured to control the lamp unit 200 to form the road pattern 400 for the safety of the driver who exits of the vehicle 10, when the door of the vehicle 10 is opened in a state in which the vehicle 10 is parked or stopped. In particular, the road pattern 400 may also be allowed to flicker or be continuously turned on. Additionally, when the driver exits the vehicle 10, the control unit 300 may not only turn on the first lamp 210 to form the road pattern 400, but also additionally turn on the second lamp unit 220, thereby preventing any injury or casualty in advance.

Figure 19:
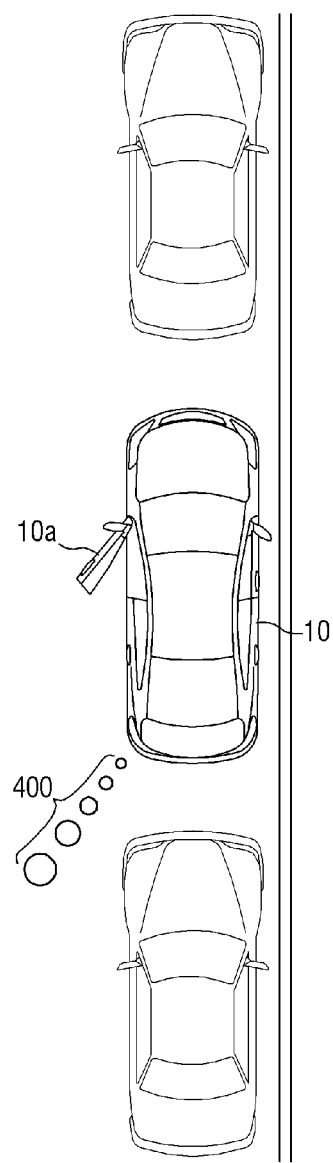
FIGS. 19 to 22 schematically illustrate road patterns when a door is open in accordance with the exemplary embodiment of the present invention.
Figure 20:
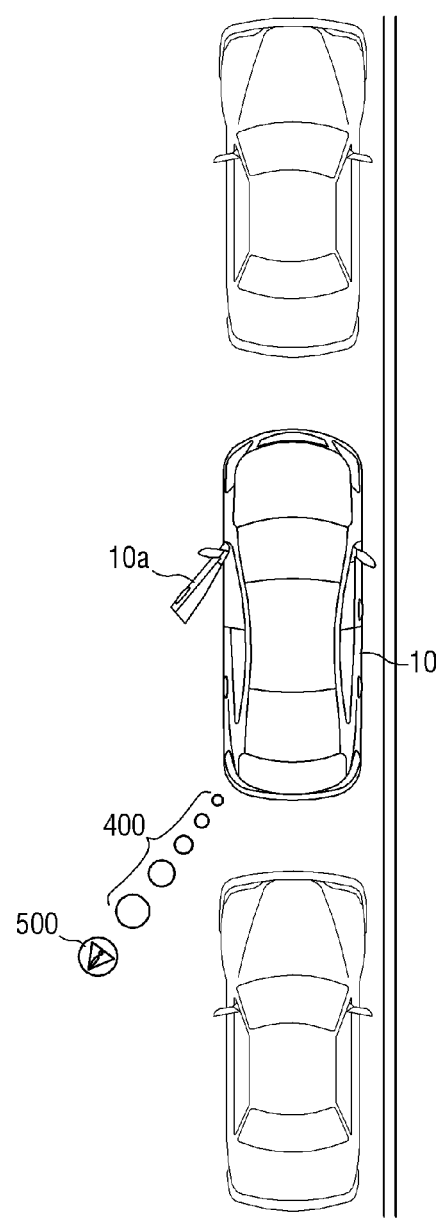

In addition, referring to FIG. 19, when a door 10a of the vehicle 10 is opened when the vehicle 10 is parked or stopped on the side of a road, the control unit 300 may be configured control a first lamp unit 210 on the other side of the road to form a road pattern 400. Alternatively, referring to FIG. 20, the control unit 300 may be configured to control a first lamp unit 210 on the other side of the road to form a road pattern 400, and may also be configured to control a second lamp unit 220 on the other side of the road to form a road pattern 500.

Figure 21:
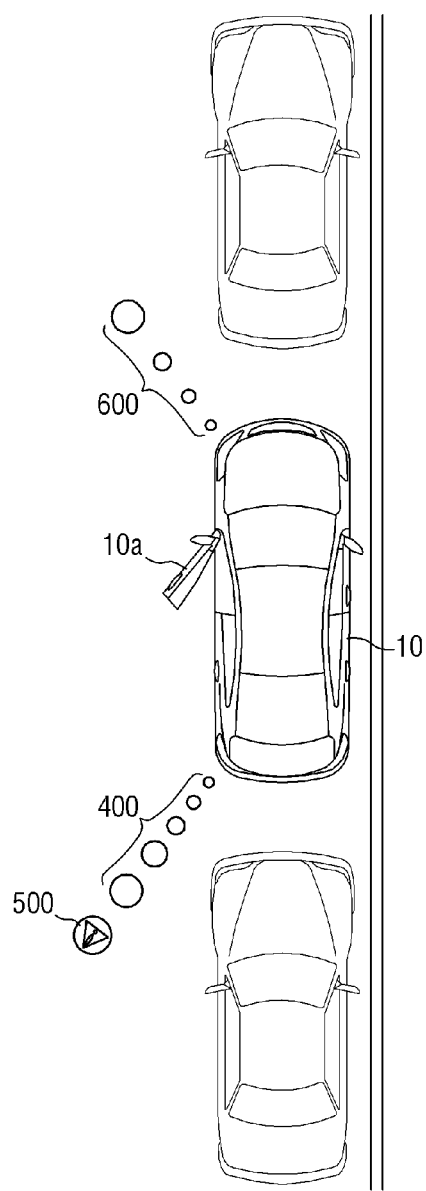

Referring to FIG. 21, in a narrow road such as an alley, the control unit 300 may be configured to form a road pattern 400 at the rear of the vehicle 10, and may also be configured to form a road pattern 600, which is similar to the road pattern 400, at the front of the vehicle 10. In particular, the likelihood that an accident may be caused not only by a vehicle approaching from the rear of the vehicle 10, but also by a vehicle approaching from the front of the vehicle 10, may increase in a narrow road.

In some exemplary embodiments of the present invention, the first lamp unit 210 may be installed at one side of the rear of the vehicle 10, and also at one side of the front of the vehicle 10, and the second lamp unit 220 may also be installed at one side of the front of the vehicle 10, as necessary. In a case when the first lamp unit 210 is provided at the front of the vehicle 10, a road pattern 400 may be formed at the front of the vehicle 10 and may have a particular horizontal irradiation angle and a particular horizontal irradiation angle with respect to the ground and the central line C of the vehicle 10, respectively, for example a road pattern 400 may be formed at the rear of the vehicle 210.

Figure 22:
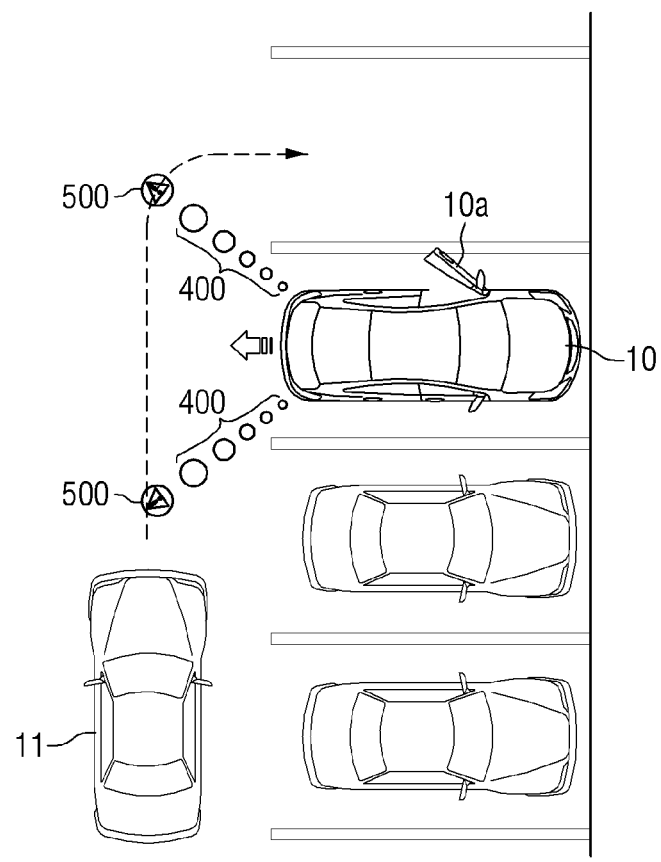

Referring to FIG. 22, when the vehicle 10 is parked in a parking lot, rather than on the side of a road, road patterns 400 and 500 may be formed by the first lamp unit 210 and the second lamp unit 220, respectively. Accordingly, the driver of the vehicle 10 may be prevented from being injured by the ambient vehicle 11 while opening the door 10a and getting out of the vehicle 10. In the exemplary embodiment of FIG. 20, the road patterns 400 and 500 are both formed by the first and second lamp units 210 and 220, respectively, but the present invention is not limited thereto. That is, one of the road patterns 400 and 500 may be formed.

Figure 23:
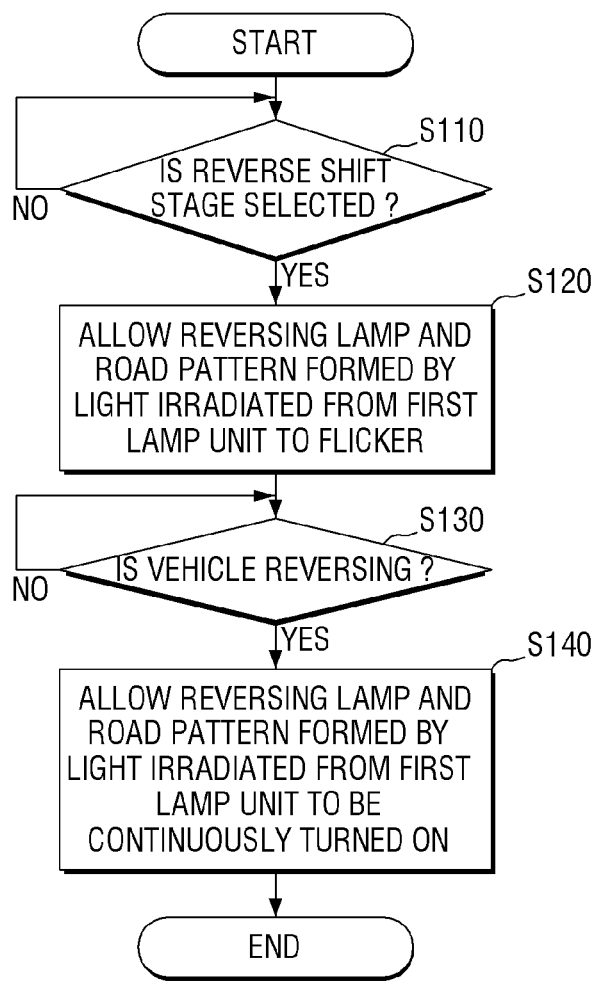
FIG. 23 is a flowchart illustrating a method for controlling road patterns in a reverse movement of a vehicle in accordance with the exemplary embodiment of the present invention.

FIG. 23 is a flowchart illustrating a method for controlling road patterns in a reverse movement of a vehicle in accordance with the exemplary embodiment of the present invention. Referring to FIG. 23, the detection unit 100 may be configured to detect whether a reverse shift stage for the reverse movement of the vehicle 10 is selected (step S110). When the reverse shift stage is selected but the vehicle 10 is stopped, the control unit 300 may be configured to turn on the reversing lamp 320 and at substantially the same time, controls the first lamp unit 210 to form a road pattern 400 on at least one side of the rear of the vehicle 10 (step S120). For example, in step S120, the reversing lamp 320 and the road pattern 400 formed by the first lamp unit 210 may be configured to flicker at predetermined intervals of time. When the reverse movement of the vehicle 10 is detected (step S130), the control unit 300 may be configured to control the reversing lamp 320 and the road pattern 400 formed by the first lamp unit 210 to be continuously turned on (step S140).

In the exemplary embodiment of FIG. 23, no road pattern 500 is formed by the second lamp unit 220, but the present invention is not limited thereto. In other words, in steps S120 and S140, a road pattern 500 may be formed by the second lamp unit 220 along with the road pattern 400 formed by the first lamp unit 210, as illustrated in FIG. 21. In the exemplary embodiment of FIG. 23, when a reverse shift stage is selected but the vehicle 10 is still stopped, the road pattern 400 may be configured to flicker, and may be continuously turned on while the vehicle 10 is reversing. However, the present invention is not limited to the exemplary embodiment of FIG. 23. That is, the road pattern 400 and the reversing lamp 320 may both flicker or be continuously turned on, or one of the first lamp unit 210 and the reversing lamp 320 may flicker, while whichever of the first lamp unit 210 and the reversing lamp 320 does not flicker may be continuously turned on.

FIG. 23 illustrates an exemplary example in which the vehicle 10 reverses in response to the selection of the reverse shift stage, but the present invention is not limited thereto. In particular, the present invention may also apply to a reverse movement of the vehicle 10 due to an external factor (e.g., an inclined road). Examples of the reverse movement of the vehicle 10 due to an external factor include both a case in which the vehicle 10 reverses due to an external factor with the reverse shift stage selected and a case in which the vehicle 10 reverses due to an external factor without the reverse shift stage selected. In the case in which the vehicle 10 reverses due to an external factor without the reverse shift stage selected, steps S110 and S120 may not be performed.

Figure 24:
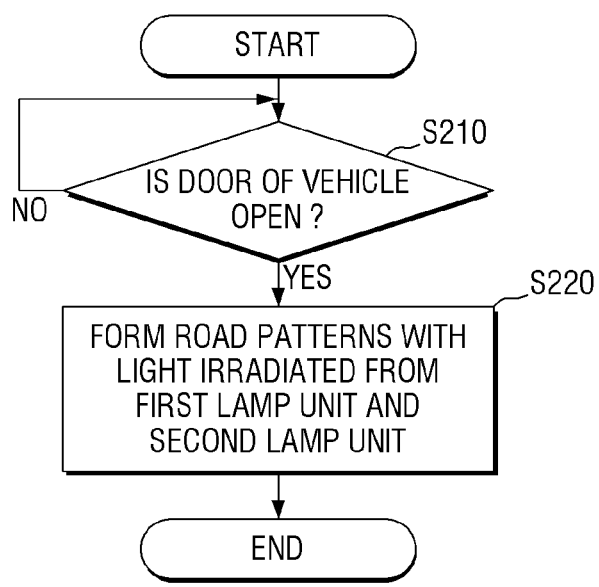
FIG. 24 is a flowchart illustrating a method for controlling road patterns when a door is open in accordance with the exemplary embodiment of the present invention.

FIG. 24 is a flowchart illustrating a method for controlling road patterns when a door of a vehicle is open in accordance with the exemplary embodiment of the present invention. More specifically, FIG. 24 illustrates an example of how to control road patterns when the door 10a of the vehicle 10 may be open when the vehicle 10 is parked or stopped on the side of a road or in a parking lot. Referring to FIG. 24, the detection unit 100 may be configured to detect whether the door 10a of the vehicle 10 is open (step S210).

In response to the door 10a of the vehicle 10 being detected to be open, the control unit 300 may be configured to control the first lamp unit 210 and the second lamp unit 220 to form a road pattern 400 and a road pattern 500 (step S220). In the exemplary embodiment of FIG. 24, when the door 10a is open, the road patterns 400 and 500 are both formed by the first lamp unit 210 and the second lamp unit 220, respectively, but the present invention is not limited thereto. In other words, one of the road patterns 400 and 500 may be formed, or in a case in which the first lamp unit 210 or the second lamp unit 220 is installed at the rear, and also at the front of the vehicle 10, road patterns may also be formed at the front of the vehicle 10.

In the exemplary embodiments of FIGS. 23 and 24, the road pattern 400 formed by the first lamp unit 210 may have a horizontal irradiation angle Φ of about 20 degrees to 45 degrees and a vertical irradiation angle θ1 of about 15 degrees to 45 degrees and may have a luminous intensity of about 4,300 cd to 13,000 cd in consideration of the ambient brightness. A plurality of irradiation patterns 410, 420, 430, 440, and 450 included in the road pattern 400 formed by the first lamp unit 210 may be formed at the same time or one after another, and may have the same shape or size or have different shapes or sizes.

As described above, according to the present invention, when the vehicle 10 reverses or a door of the vehicle 10 is opened when there is an ambient vehicle approaching from one side of the rear of the vehicle 10, light for road patterns indicating the reverse movement of the vehicle or the opening of a door of the vehicle 10 is irradiated to the rear of the vehicle. Thus, the ambient vehicle may recognize, and be prepared against, any accident that may be caused because of failure to identify the reversing lamp 320 or the opened door of the vehicle 10.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An automotive lamp, comprising:
   a detection unit configured to detect a driving state of a vehicle;
   a reversing lamp configured to indicate a reverse movement of the vehicle;
   a lamp unit configured to irradiate light that forms a road pattern indicating the driving state of the vehicle to the rear of the vehicle and forms the road pattern on at least one side of the vehicle; and
   a control unit configured to control the lamp unit based on the detected driving state of the vehicle,
   wherein the luminous intensity of the lamp unit is greater than, the luminous intensity of the reversing lamp,
   wherein when the reversing lamp turns on, the lamp unit also forms the road pattern at the same time,
   wherein a vertical irradiation angle of the lamp unit is in a range of about 15 degrees to about 45 degrees, and
   wherein an irradiation area of the lamp unit is disposed below an irradiation area of the reversing lamp.

2. The automotive lamp of claim 1, wherein the driving state of the vehicle includes a reverse movement of the vehicle.

3. The automotive lamp of claim 1, wherein the luminous intensity of the lamp unit is about 4,300 cd to 13,000 cd.

4. The automotive lamp of claim 1, wherein the lamp unit and the reversing lamp are disposed in one of a plurality of spaces, which are defined by a plurality of lamps for different purposes, and the lamp unit shares, with the reversing lamp, a lens that corresponds to the space where the reversing lamp is disposed, or has a lens of the same color as the reversing lamp.

5. The automotive lamp of claim 1, wherein the control unit is configured to simultaneously turn on or off the reversing lamp and the lamp unit.

6. The automotive lamp of claim 1, wherein the reversing lamp includes a plurality of light source components and the control unit is configured to turn off the lamp unit when at least one of the light source components of the reversing lamp is turned off.

7. The automotive lamp of claim 1, wherein the lamp unit is turned off when an ambient brightness is greater than a reference brightness.

8. The automotive lamp of claim 1, wherein a horizontal irradiation angle and a vertical irradiation angle of the lamp unit are acute angles.

9. The automotive lamp of claim 8, wherein the horizontal irradiation angle of the lamp unit is in a range of about 20 degrees to about 45 degrees.

10. The automotive lamp of claim 1, wherein the road pattern includes a plurality of irradiation patterns, which are circular, and the irradiation patterns have the same size or different sizes.

11. An automotive lamp, comprising:
    a detection unit configured to detect a driving state of a vehicle;
    a reversing lamp configured to indicate a reverse movement of the vehicle;
    a lamp unit configured to irradiate light that forms a road pattern indicating the driving state of the vehicle to the rear of the vehicle and forms the road pattern on at least one side of the vehicle; and
    a control unit configured to adjust the lamp unit based on the detected driving state of the vehicle,
    wherein a luminous intensity of the lamp unit is equal to or greater than a luminous intensity of the reversing lamp,
    wherein when the reversing lamp turns on, the lamp unit simultaneously forms the road pattern,
    wherein a vertical irradiation angle of the lamp unit is in a range of about 15 degrees to about 45 degrees, and
    wherein the vertical irradiation angle is at least 5 degrees greater than an irradiation angle of the reversing lamp.

12. The automotive lamp of claim 11, wherein the detection unit is configured to detect whether a rear shift stage is selected.

13. The automotive lamp of claim 11, wherein a plurality of lamp units form a plurality of road patterns symmetrical with each other with respect to a central line of the vehicle.

14. The automotive lamp of claim 13, wherein each of the plurality of road patterns includes a plurality of irradiation patterns, which are circular, and the area of an irradiation pattern more distant than a neighboring irradiation pattern from the vehicle is 1.2 to 2 times the area of the neighboring irradiation pattern.

15. The automotive lamp of claim 14, wherein each of the irradiation patterns has different brightnesses from a central area to an edge area thereof.

16. The automotive lamp of claim 14, wherein each of the irradiation patterns is brighter in the central area than in the edge area thereof.

17. The automotive lamp of claim 11, wherein the luminous intensity of the lamp unit is in a range of about 4,300 cd to about 13,000 cd.

18. The automotive lamp of claim 11, wherein the horizontal irradiation angle of the lamp unit is in a range of about 20 degrees to about 45 degrees.

\* \* \* \* \*